United States Patent [19]

Marsaud et al.

[11] Patent Number: 5,738,374
[45] Date of Patent: Apr. 14, 1998

[54] PYROTECHNIC GAS GENERATOR FOR INFLATABLE AIR-BAG OF A MOTOR VEHICLE

[75] Inventors: Benoît Marsaud, Neaufles Saint Martin; Christian Perotto, Ballancourt; Daniel Duvacquier, Bordeaux; Michel Kozyreff, Bonsecours, all of France

[73] Assignee: SNC Livbag, Vert Le Petit, France

[21] Appl. No.: 609,000

[22] Filed: Feb. 5, 1996

[30] Foreign Application Priority Data

Feb. 23, 1995 [FR] France .................. 95 02100

[51] Int. Cl.⁶ .................. B60R 21/28
[52] U.S. Cl. .................. 280/741
[58] Field of Search .................. 280/736, 741, 280/737

[56] References Cited

U.S. PATENT DOCUMENTS

| | | | |
|---|---|---|---|
| 3,901,747 | 8/1975 | Garner | 280/741 |
| 4,158,696 | 6/1979 | Wilhelm | 280/736 |
| 4,370,930 | 2/1983 | Strasser et al. . | |
| 4,817,828 | 4/1989 | Goetz . | |
| 4,846,368 | 7/1989 | Goetz . | |
| 4,865,635 | 9/1989 | Cuevas . | |
| 4,948,439 | 8/1990 | Poole et al. | 280/741 |
| 5,048,862 | 9/1991 | Bender et al. . | |
| 5,116,080 | 5/1992 | Wipasuramonton . | |
| 5,308,588 | 5/1994 | Emery et al. . | |
| 5,366,239 | 11/1994 | Headley . | |
| 5,468,016 | 11/1995 | Kobari et al. | 280/741 |
| 5,531,475 | 7/1996 | Meduvsky et al. | 280/741 |

FOREIGN PATENT DOCUMENTS 609 981   8/1994   European Pat. Off. .
2 691 706  12/1993  France .

OTHER PUBLICATIONS

Patent Abstracts of Japan, vol. 17, No. 497, (M–1476), Sep. 8, 1993, & JP-A-05 124481 May 21, 1993.

*Primary Examiner*—Paul N. Dickson
*Attorney, Agent, or Firm*—Pillsbury Madison & Sutro LLP

[57] ABSTRACT

The invention relates to a pyrotechnic gas generator (1) intended for motor vehicle safety. The generator (1) comprises a hollow cylindrical body (2, 3) having gas outlet orifices (4) and being closed by a ring (6). The generator (1) contains an annular pyrotechnic charge (18) arranged around an ignition device (14, 16, 17) carried by the closure ring (6). The charge (18) essentially consists of a silicone binder and a mixture of ammonium perchlorate and of sodium nitrate. Its dimensions are less than the internal dimensions of the body of the generator, so that the ratio (dead volume/volume of the block) lies between 2 and 1 in order for it to be possible for the gases originating from the ignition device (14, 16, 17) to cover all of the free surfaces of the charge (18). A thin metal casing (25) is interposed between the charge (18) and the orifices (4). The generator is used for inflating an air bag.

10 Claims, 5 Drawing Sheets

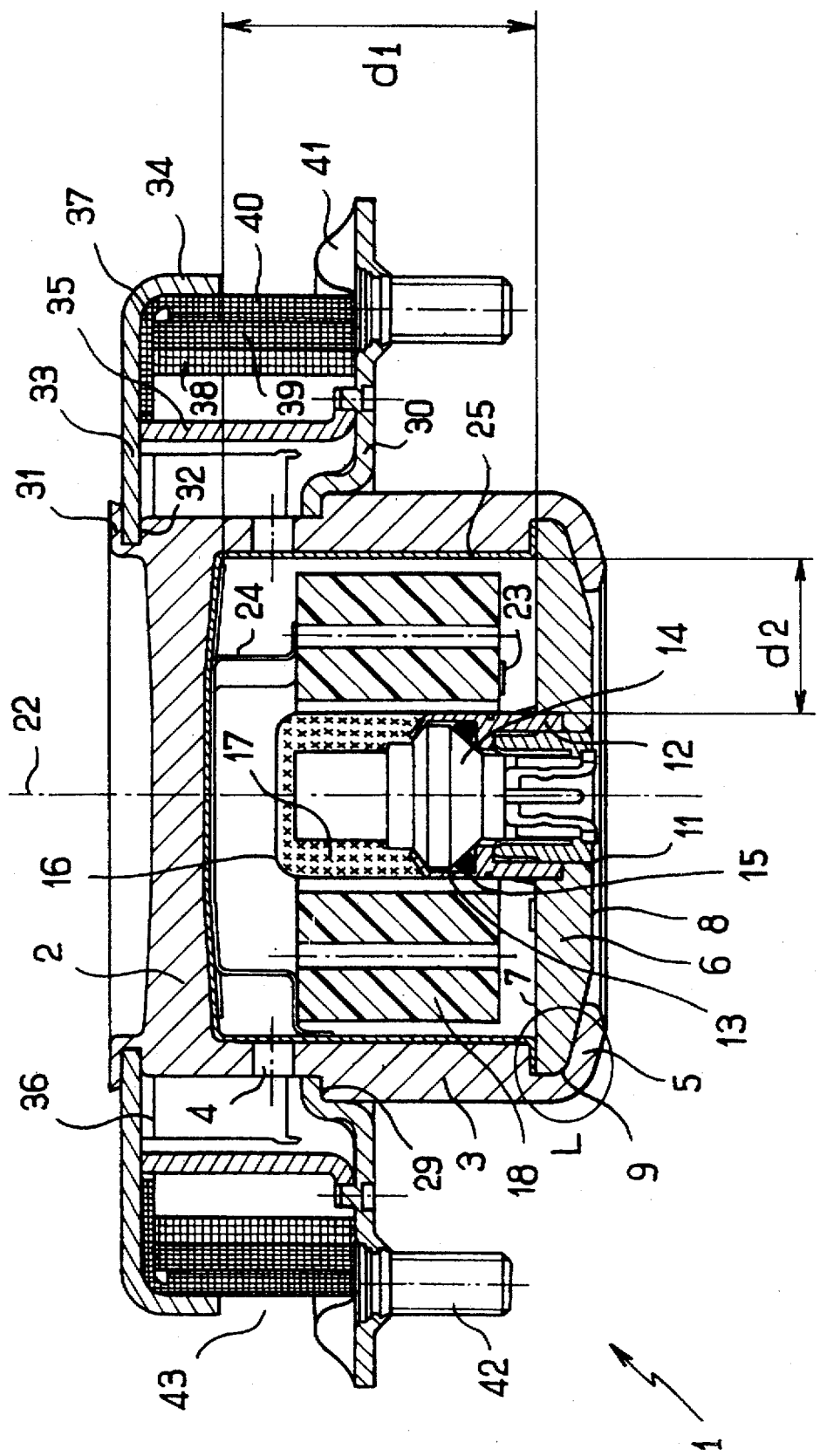
FIG_1

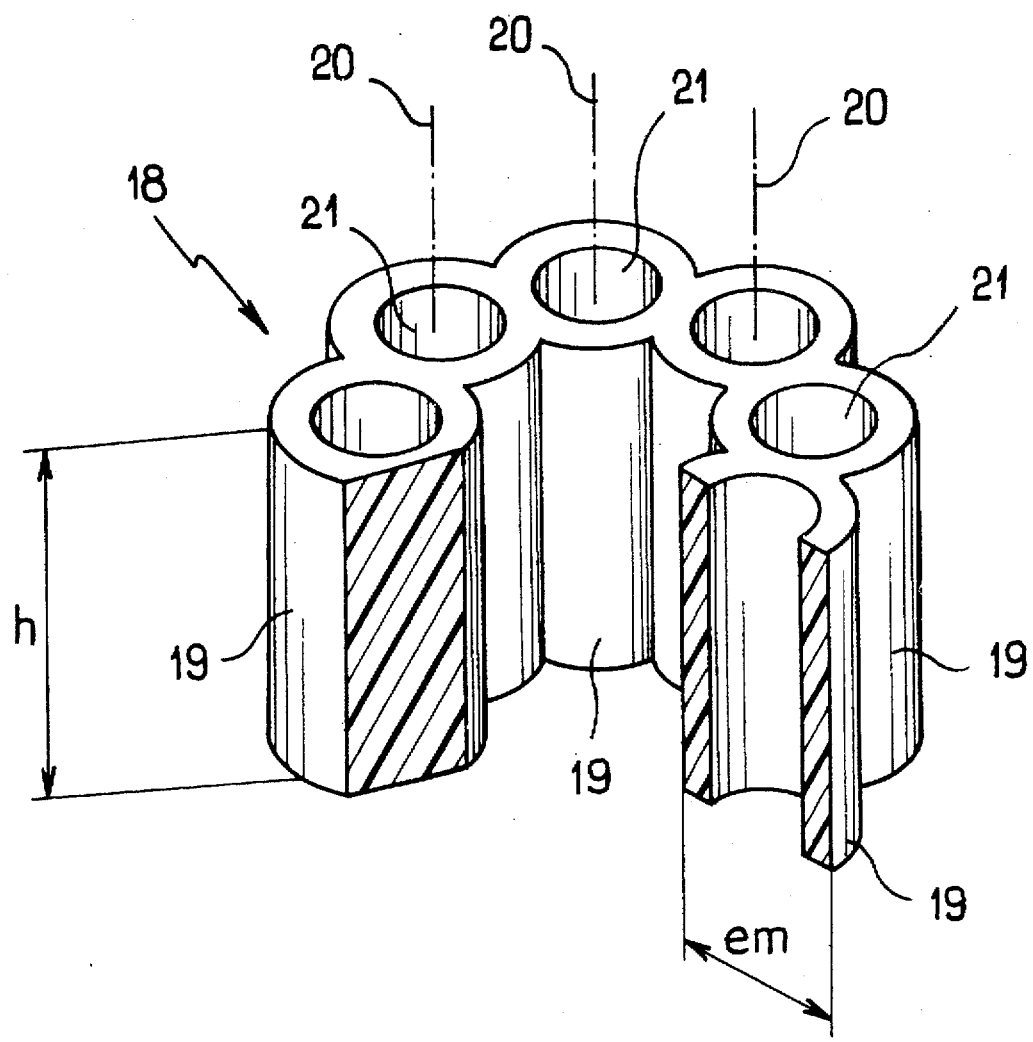
FIG_2

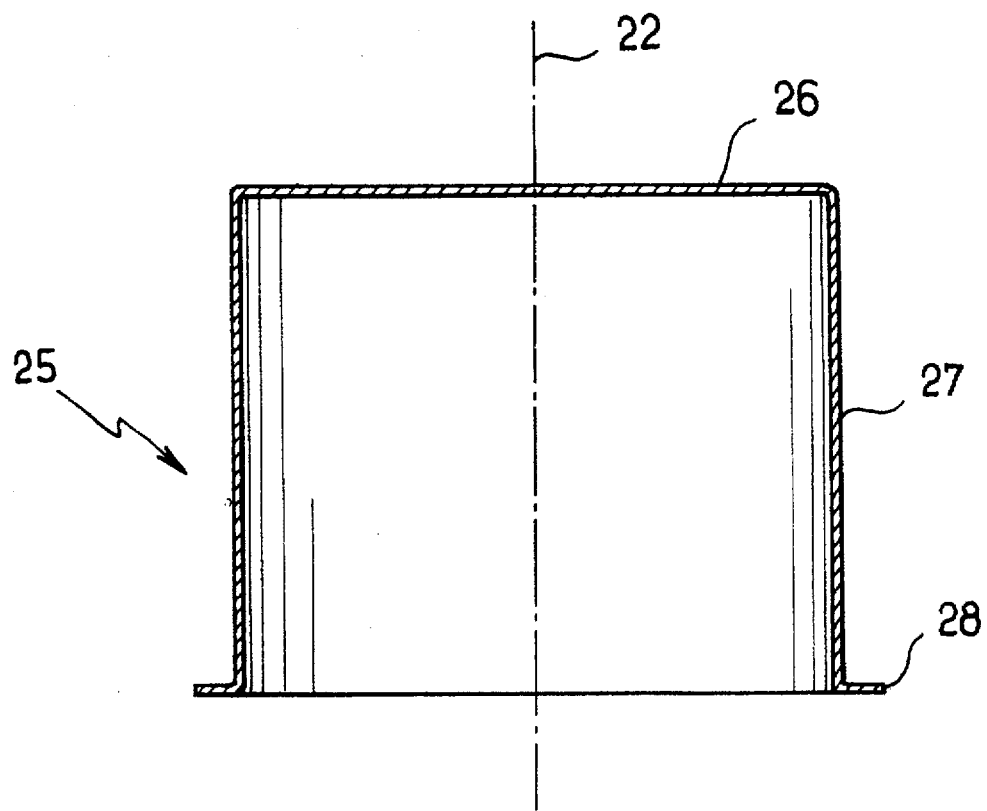
FIG_3
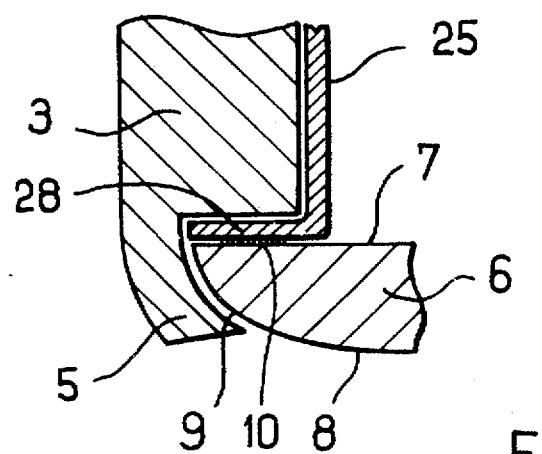
FIG_4

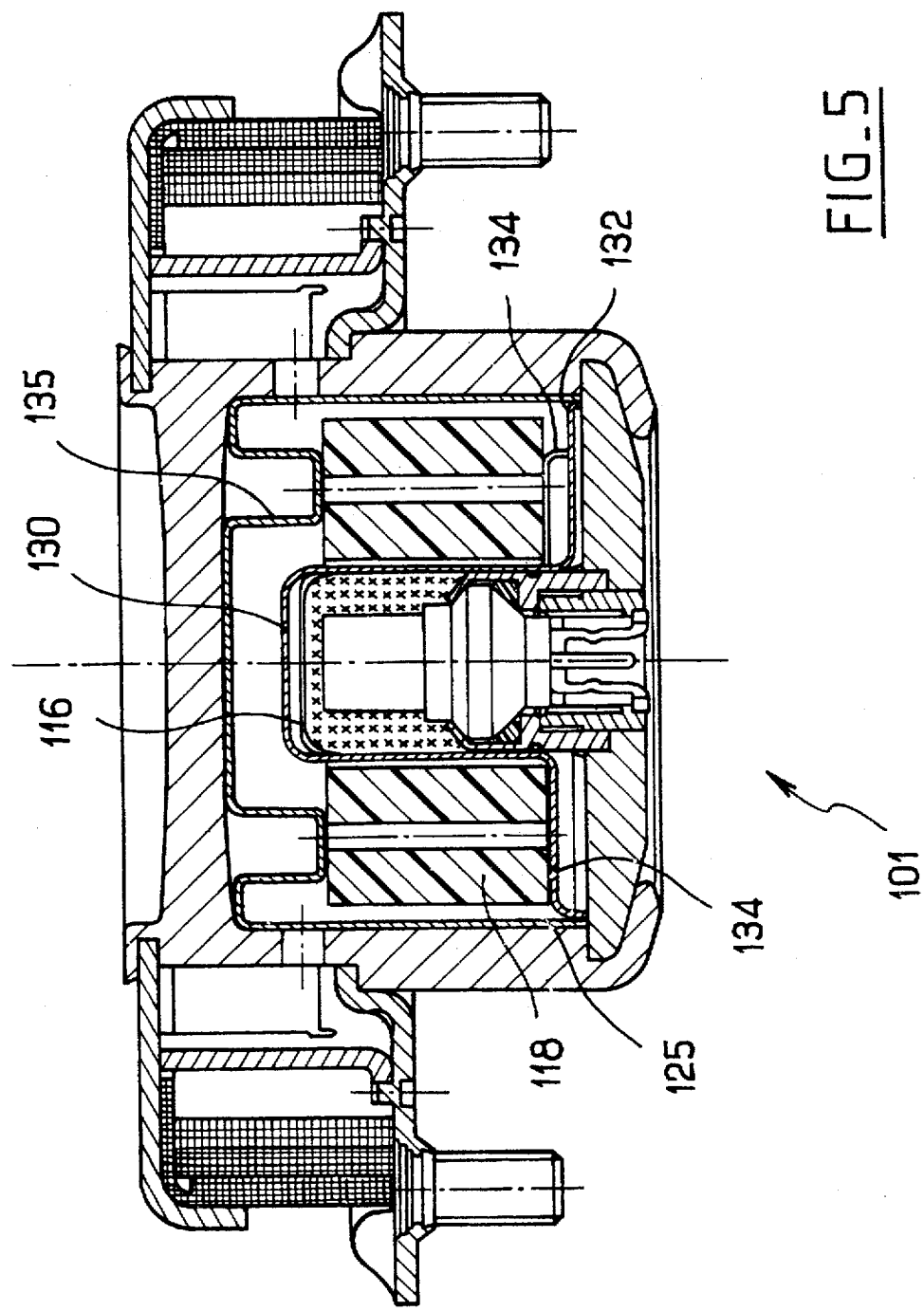
FIG._5

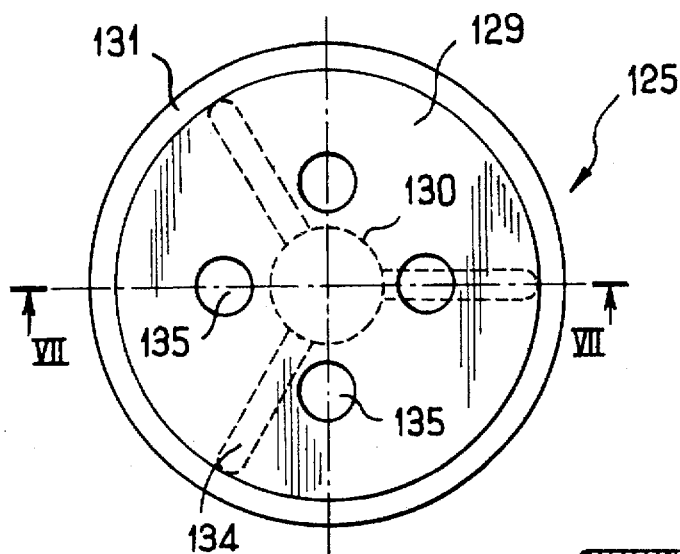
FIG_6
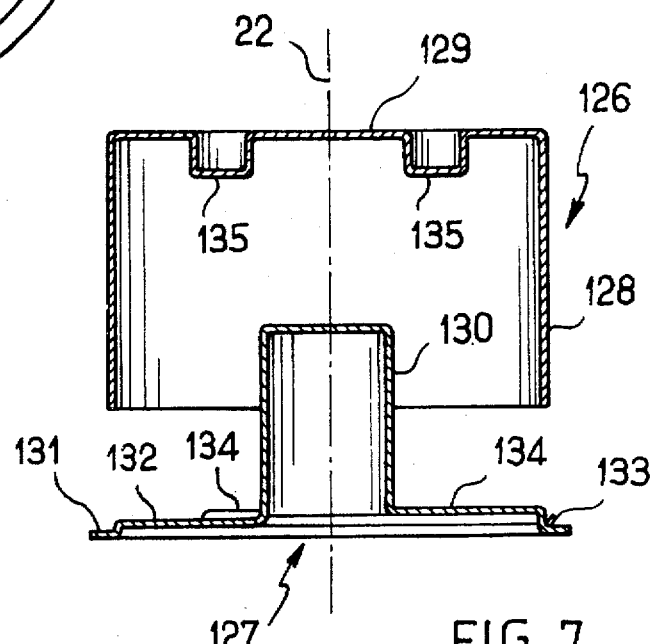
FIG_7
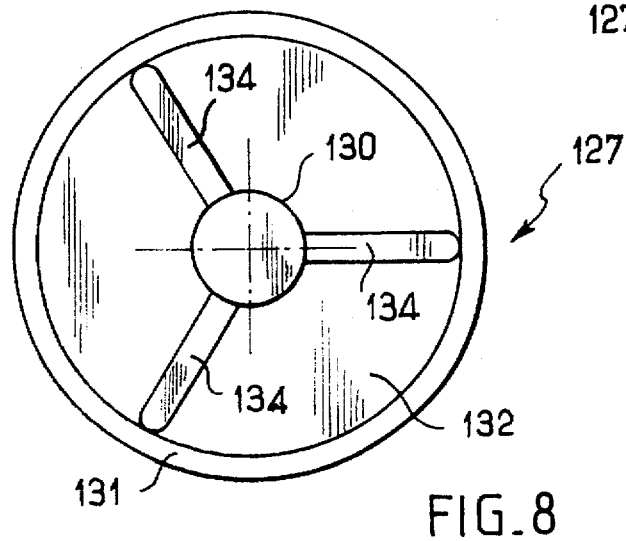
FIG_8

PYROTECHNIC GAS GENERATOR FOR INFLATABLE AIR-BAG OF A MOTOR VEHICLE

The present invention relates to the field of protecting the occupants of a motor vehicle in the event of an accident.

More precisely, the invention relates to a pyrotechnic gas generator intended to inflate an air bag in the event of an accident. The generator which forms the subject-matter of the present invention is more particularly intended to be placed in the steering wheel of the vehicle and to protect the driver.

Numerous pyrotechnic gas generators, intended to protect the driver of a vehicle, are known. The structure of these generators depends on the nature and the form of the pyrotechnic charge employed.

A first family of pyrotechnic compositions used for the purpose of motor vehicle safety consists of mixtures of alkali metal or alkaline-earth metal nitrides and of metallic compounds.

Because of the difficulty of agglomerating such mixtures, pyrotechnic charges consisting of this family of compositions are most often in the form of a multiplicity of small elementary charges: granulates, pellets, discs, etc.

Thus, U.S. Pat. No. 5,308,588 describes a gas generator containing as pyrotechnic charge a plurality of annular discs of nitride-based pyrotechnic compositions.

The charge, contained in a cylindrical aluminium case of relatively complex structure, is placed in a generator equipped with filtration cheers because of the high level of hot dust in the gases originating from the combustion of nitride-based compositions. Such generators are relatively complex to produce and their cost price remains high.

A second family of pyrotechnic compositions consists of mixtures of nitrocellulose and of nitroglycerine, also known by the name "double-based powders".

These compositions are advantageous because they are well-suited to continuous use which makes it possible, by extrusion, to obtain charges in the form of annular blocks which are easy to use on a continuous assembly line for gas generators. Moreover, these compositions burn to produce a low amount of solid residues and do not require the presence of filtration devices in the generator. On the other hand, these compositions produce gases having a relatively high carbon monoxide content, which requires the presence in the generator of complementary oxidation components as described, for example, in Patent FR-A 2,691,706. Moreover, these compositions exhibit certain limitations with regard to their thermal stability in accelerated ageing simulation programmes.

A third family of pyrotechnic compositions consists of mixtures of organic binder and oxidant fillers, in particular based on inorganic perchlorates. These compositions are advantageous but, in order to lead to charges with stable geometry, they require the use of a cross-linkable binder which has to date been very difficult to employ in continuous processes. For this reason, the person skilled in the art has neither developed this type of composition to any special degree for motor vehicle safety, nor developed gas generators suited for them.

The recent progress achieved in the field of continuous extrusion of rocket propellants having a cross-linkable binder, and in particular rocket propellants having a silicone binder, give renewed interest to charges of this third family, but there is no simple generator which is both easy to assemble continuously and which is suited to this type of composition, available to the person skilled in the art.

The object of the present invention is precisely to provide such a generator.

The invention therefore relates to a pyrotechnic gas generator for an air bag intended to protect the occupants of a motor vehicle, comprising, in particular:

i) a hollow cylindrical body consisting of a circular base extended by a cylindrical lateral wall, the said lateral wall having, at its end fixed to the said base, orifices which connect the inside and the outside of the said hollow body, ii) a circular closure ring crimped into the end of the lateral wall opposite the said base, the said ring having a central orifice in which a cylindrical ignition device which penetrates inside the said hollow body is fixed in a gas-tight manner, iii) a pyrotechnic charge in the form of an annular block, arranged inside the said hollow body around the said ignition device, the said generator being characterized in that iv) the said pyrotechnic charge essentially consists of a silicone binder and of a mixture of ammonium perchlorate and sodium nitrate, v) the height of the said annular charge is less than the distance existing inside the said hollow body between the inner surfaces of the closure ring and of the said base, and in that the maximum thickness of the said annular charge is less than the radial distance separating, inside the said hollow body, the inner surface of the lateral wall and the ignition device, so that the gases originating from the ignition device can cover all of the free surfaces of the said annular charge, vi) wedging means which allow the gases to circulate are arranged between the closure ring and the charge, on the one hand, and between the base and the charge, on the other hand, vii) and in that, inside the said hollow body, a thin metal casing is interposed between the said charge and the inner surfaces of the said lateral wall and of the said base so as to close off the said orifices in a gas-tight manner.

According to a first preferred embodiment of the invention, the annular pyrotechnic charge includes a plurality of hollow internal cylindrical channels whose axes are equidistant from the axis of the body of the generator.

According to a second preferred embodiment of the invention, the closure ring has a plane upper face and a lower face forming, with the said upper face, a rounded lip onto which the end of the lateral wall of the body of the generator opposite the said base is crimped. This embodiment allows uncrimping of the closure ring as the only mode of breaking in the event of accidental overpressure in the generator.

In the present description, the term "upper" will apply to any object oriented towards the base of the body of the generator, whereas the term "lower" will apply to any object oriented towards the end of the lateral wall of the body of the generator opposite the said base.

According to this embodiment, a hollow cylindrical neck having a thinned end will be fitted in a leak-tight manner into the central orifice of the closure ring and the ignition device will comprise a cylindrical cap which will surround the said neck, an igniter being crimped in a gas-tight manner into the thinned end of the said neck. The space contained between the said cap and the said igniter will advantageously be filled with an ignition powder such as, for example, a powder based on boron and potassium nitrate, of the type $B/KNO_3$.

According to a first preferred variant of the invention, the said thin metal casing has the form of a cylindrical case closed at one of its ends via a circular face, the other end being open. According to this variant, the open end of the cylindrical case will advantageously be pinched into the crimping of the closure ring by the lower end of the lateral wall of the body of the generator.

According to a second preferred variant of the invention, the said thin metal casing has the form of a cylindrical case closed at its upper end by a substantially plane face and at its lower end by a circular face having a central cylindrical housing in which the ignition device carried by the closure ring of the generator can be housed.

According to this second variant, each of the circular faces of the said case can incorporate the wedging means for the pyrotechnic charge, in the form of cylindrical bosses or radial ribs which allow the gases to circulate, which leads to an advantageous simplification of the assembling of the generator.

Whatever the variant chosen, the thin metal casing acts as a capsule for the orifices carried by the lateral wall of the body of the generator.

It must therefore be capable of breaking under the effect of a predetermined increase in the pressure inside the body of the generator. The breaking threshold of this casing will in general correspond to a pressure increase of the order of 10 MPa (100 bar). This casing will advantageously consist of a thin aluminium sheet.

According to a third preferred embodiment of the invention, the lateral wall of the body of the generator has an external shoulder which is located under the said orifices and which supports an outer ring.

According to this embodiment, the base of the body of the generator includes a peripheral lip which makes it possible to fasten an external annular diffuser by crimping it onto the circumference of the base. This external diffuser overhangs the outer ring.

A deflector and a condenser which consists of a plurality of metallic meshes are then wedged into the space contained between the outer ring and the diffuser.

The outer ring advantageously has at least one rib on its upper face, making it possible to position the deflector and the condenser correctly.

The invention thus makes it possible to provide a gas generator whose architecture is very simple and whose assembly can be fully automated.

The composite pyrotechnic charge according to the invention has an excellent gas yield. The only solid residues produced, silica and sodium chloride, are bound by condensation on the meshes of the condenser.

Moreover, this type of charge can be obtained continuously by extrusion with a highly advantageous cost price.

A detailed description is given hereinbelow of a preferred embodiment of the invention with reference to FIGS. 1 to 8.

FIG. 1 represents, seen in section, a generator according to the invention in which the thin metal casing of the pyrotechnic charge corresponds to the first preferred variant.

FIG. 2 represents, seen in partially exploded perspective, an annular pyrotechnic charge block according to the invention.

FIG. 3 represents, seen in section, the thin metal casing before it is fitted into the generator in FIG. 1.

FIG. 4 represents a magnified view of the part L in FIG. 1.

FIG. 5 represents, seen in section, a generator according to the invention in which the thin metal casing corresponds to the second preferred embodiment.

FIG. 6 represents, in plan view, the thin metal case used in the generator represented in FIG. 5.

FIG. 7 represents, in front section, along VII—VII, the two constituent elements of the case represented in FIG. 6.

FIG. 8 represents a plan view of the lower element represented in FIG. 7.

The invention therefore relates to a pyrotechnic gas generator 1 intended to inflate an air bag for protecting occupants of a motor vehicle.

The generator 1 comprises a hollow cylindrical casing consisting of a circular base 2 extended by a cylindrical wall 3.

The base 2 and the lateral wall 3 are preferably made of monobloc light metal, so as to form a single part as represented in FIG. 1. A plurality of hollow, generally cylindrical, orifices 4 pass through the lateral wall 3. These orifices, arranged in the upper part of the lateral wall 3 in proximity to the base 2, connect the inside and the outside of the body of the generator. The lateral wall 3 is terminated in its lower part by a thinned end 5 capable of being crimped.

The body of the generator 1 is closed by a closure ring 6 crimped into the thinned end 5 of the lateral wall 3 of the body of the generator.

Advantageously, as represented in FIG. 1, the base 2 of the body of the generator 1 is solid and includes no opening, whereas the closure ring 6 has a plane upper face 7 and a lower face 8 forming, with the said upper face 7, a rounded lip 9. The end 5 of the lateral wall 3 is therefore crimped onto a rounded lip 9 and can be detached, in the event of accidental overpressure in the generator 1, with ejection of the closure ring 6. If the latter is oriented towards the steering column of the vehicle, the base 2 being oriented towards the occupant of the vehicle, a generator is thus provided which is equipped with a safety opening for the event of accidental overpressure.

The closure ring 6 has a cylindrical central orifice 11 in which a hollow cylindrical neck 12 is fitted in a gas-tight manner, which neck has a thinned free end 13. This neck will preferably consist of a relatively flexible metal such as, for example, a stainless steel.

An igniter 14 is crimped in a leaktight manner, for example using a seal 15, into the said thinned end 13 of the neck 12. The igniter 14 may be an electrical igniter or a percussion igniter.

A cylindrical cap 16 made of very thin and easily fragmentable metal is fitted around the said neck 12.

The space contained between the cap 16 and the igniter 14 is filled with an ignition power 17 such as, for example, a powder of type B/KNO$_3$.

The closure ring 6 thus carries a cylindrical ignition device consisting of the cap 16, the neck 12, the igniter 14 and the powder 17. This ignition device penetrates inside the body of the generator 1.

A pyrotechnic charge 18 in the form of an annular block is arranged around this ignition device. This charge consists, according to a first characteristic of the invention, of a composite propellant containing silicone binder.

The term composite propellant means a pyrotechnic composition consisting of a binder containing an oxidant filler. Since the pyrotechnic charge block should not be deformed over time as a function of temperature variations, the binder will be a cross-linked binder. For reasons of combustion rates, the oxidant filler will advantageously consist of ammonium perchlorate. In this case, for considerations of non-toxicity of the combustion gases, the composition will advantageously contain a chlorine scavenger such as sodium nitrate which, at the moment of combustion, fixes the chlorine from the perchlorate in the form of sodium chloride.

A preferred family of composite propellants in the context of the present invention consists of propellants having silicone binder and filled with a mixture of ammonium perchlorate and sodium nitrate, as described in U.S. Pat. No. 5,610,444.

It is actually easy to extrude such propellants continuously in the form of annular blocks.

FIG. 2 represents a preferred form of a charge 18 according to the invention.

This charge is in the form of a block consisting of a plurality of hollow cylindrical tubes 19, having parallel axes 20, overlapping one another so as to be slightly secant, as represented in FIG. 2. Characteristically, the block 18 therefore has a plurality of hollow cylindrical channels 21 whose axes 20 are equidistant from the axis 22 of the generator. This geometry, which offers a very large burnable surface area for a small burnable thickness is very favourable for good progression of the combustion of the charge 18 and promotes correct deployment of the air bag which is not shown in the figures.

However, in order to ensure this result, it is necessary for the pyrotechnic charge to be capable of being ignited simultaneously over all its free surfaces and, for this purpose, it is necessary to ensure that the hot gases originating from the ignition device can cover all of the free surfaces of the block constituting the gas generator charge.

To this end, the pyrotechnic charge 18 should, according to a second characteristic of the invention, satisfy a double geometrical condition.

On the one hand, the height h of the pyrotechnic charge 18 should be less than the distance $d_1$ existing inside the body of the generator between the internal surfaces of the closure ring 6 and of the cover 2.

This height h will preferably be actually less than the height of the lateral wall 3 contained between the upper face 7 of the closure ring 6 and the base of the orifices 4, as represented in FIG. 1.

On the other hand, the maximum thickness $e_m$ of the annular charge 18, measured along a radius of this charge, should be less than the radial distance $d_2$ separating, inside the body of the generator, the internal surface of the lateral wall 3 and the cap 16 of the ignition device.

By virtue of the existence of these geometrical conditions, there is a "dead" volume, inside the generator 1, which is neither occupied by the pyrotechnic charge 18 nor by the ignition device. The Applicant Company has observed that the ratio R between this dead volume and the volume of the annular block of the pyrotechnic charge 18 should preferably satisfy the relationship: $1 \leq R \leq 2$.

This ratio R will advantageously be close to 1.4.

In view of these functional imperatives, it is necessary to provide wedging means, which allow the gases to circulate, between the pyrotechnic charge 18 and the closure ring 6 on the one hand, and between the charge 18 and the base 2, on the other hand.

Thus, in the case of the generator represented in FIG. 1, a wedging spring 23 has been provided between the closure ring 6 and the charge 18, and a wedging part 24 has been provided between the charge 18 and the cover 2.

This wedging part has the form of a tripod bearing, on the one hand, on the block 18 and, on the other hand, against the face 26 of the casing 25, which will be described slightly further on. This tripod 24 consists of thin stainless steel.

According to a last essential characteristic of the invention, in order to protect the charge 18 and the ignition device from moisture, a very thin metal casing 25 is interposed, inside the body of the generator, between the pyrotechnic charge 18 and the internal surfaces of the lateral wall 3 and of the base 2 so as to close off the orifices 4 and make them gas-tight.

According to a first variant embodiment of the invention, represented more particularly in FIGS. 3 and 4, the said casing 25 has the form of a cylindrical case consisting of a cylindrical wall 27 closed at one of its ends by a circular face 26, the other end being open and terminated by an external annular lip 28. This annular lip 28 is pinched between the lateral wall 3 of the body of the generator and the closure ring 6 during crimping of the latter. The pyrotechnic charge 18 and the ignition device are thus isolated in a leaktight manner from the orifices 4.

Advantageously, the face 7 of the ring 6 and the annular lip 28 of the casing 25 will be adhesively bonded against each other with the aid of an air-free cyano-acrylic adhesive seal 10 which acts as an isolating seal.

FIGS. 5 to 8 represent a second variant embodiment of the thin metal casing according to the invention.

In a generator 101 similar to that which has just been described and which will therefore not be described in detail, there is an annular pyrotechnic charge block 118 contained in a thin metal casing 125 which has the form of a cylindrical case closed at its upper end by a substantially plane circular face 129 and, at its lower end, by a circular face 127 having a central cylindrical housing 130 which encloses the ignition device 116.

This case consists of two elements: a lower element 127 and an upper element 126 which, when assembled together, constitute the walls of the case 125. These elements are made of a material which can break under the effect of a predetermined increase in the ambient pressure, corresponding to approximately two thirds of the operating pressure of the generator; in general this will be a pressure increase close to 10 MPa. The case 125 has, on its lower plane face 127, a central cylindrical housing 130.

As represented in FIGS. 7 and 8, the lower element 127 of the case 125 is of cylindrical general shape and will consist of a thin sheet of aluminium, or of another metal, deep-drawn so as to have a lower circular lip 131, a plane face 132 which will constitute the lower plane face of the case 125 and a raised central cylindrical part which will constitute the housing 130 of the case 125.

The upper element 126 of the case 125 has the general form of a cylindrical cap with a plane face 129 and a lateral wall 128 whose internal diameter is equal to the external diameter of the plane face 132 of the element 127.

The annular propellant block 118 is arranged around the central housing 130 and the two elements 126 and 127 are assembled together in a leaktight manner.

This assembly can be carried out by crimping the lower lip 131 or by adhesive bonding or laser welding of the lower end of the lateral wall 128 of the upper element 126 along the lateral deep-drawn surface 133 of the plane face 132 of the lower element 127.

Characteristically, the internal surfaces of the plane faces 129 and 127 of the case 125 have internal bosses 134 and 135. These bosses have a double function. On the one hand, they make it possible to wedge the propellant block 118 in the case 125 and, on the other hand, they make it possible, on ignition, to ensure circulation of gas between the plane faces of the case 125 and the block 118. These bosses may assume the form of radial ribs, as represented in the case of the lower element 127, the plane face 132 of which carries three radial ribs 134 arranged at 120°. These bosses may also assume the form of cylindrical bosses, as represented in the case of the upper element 126, the plane face 129 of which carries four cylindrical bosses 135 arranged at 90°.

Thus, according to the second variant embodiment of the invention each of the circular faces 127 or 129 of the casing 125 may incorporate the means for wedging the pyrotechnic charge 118, in the form of cylindrical bosses 135 or of radial ribs 134, which further simplifies the assembly operations of the generator. Moreover, according to this variant, the casing 125 which constitutes a complete case around the pyrotechnic charge 118 protects the latter during the handling phases before it is fitted into the generator.

The pyrotechnic compositions used in the context of the present invention have, as already stated, an excellent gas yield and essentially produce gas molecules used to inflate the air bag. The only solid residues produced are of micron size, and they do not constitute a problem when entering the air bag.

However, if it is desired to prevent the solid residues from entering the bag, this can be done by simple condensation of the sodium chloride or of the silica which are produced, onto meshes placed outside the generator, according to the third embodiment of the invention which is now described in detail with reference again to FIG. 1.

The lateral wall 3 has an external shoulder 29 which is located under the orifices 4 and which supports an outer annular ring 30.

Moreover, the base 2 has, on its upper periphery, a circular lip 31 whose diameter is slightly less than the external diameter of the base 2 itself, so as to form a plane bearing surface 32 at the periphery of the base 2, on which bearing surface an annular diffuser 33 held by crimping of the lip 31, can bear. Advantageously, this diffuser 33 has an end 34 which is curved towards the ring 30.

A deflector 35 consisting of a circular crown having openings 36 in its upper part is placed in the space contained between the said ring 30 and the said diffuser 33.

Circular meshes 38, 39 and 40, fulfilling the function of a thermal condenser for the sodium chloride and the silica, are wedged between the deflector 35 and the end 34 of the diffuser 33. The outer mesh 40 has a curved upper end 37 used to wedge the other meshes.

The outer ring 30 is also provided on its lower face with pins 42 intended for fastening the generator and the air bag which will surround the said ring.

Advantageously, the outer ring 30 has on its upper face at least one rib 41 intended to facilitate correct positioning of the condenser and of the deflector. This rib 41 may, if appropriate, be interrupted, as represented in FIGS. 1 and 5, in order to allow fitting of the pins 42.

The generator as presented in FIGS. 1 to 4 operates as follows. In the event of collision, a signal originating from an impact detector causes lighting of the igniter 14 which, in turn, ignites the ignition powder 17. The combustion gases from the latter cause the cap 16 to break and surround all the free surfaces of the pyrotechnic charge block 18, by virtue of the free spaces existing all around this block. The block 18 is thus lit on all its free surfaces and releases combustion gases. When the pressure increase in the body of the generator reaches a predetermined value, corresponding approximately to two thirds of the stable operating pressure of the charge 18, the parts of the casing 25 located opposite of the orifices 4 break and the combustion gases originating from the charge 18 leave the body of the generator and are distributed by the deflector 35 over the entire circumference of the latter, which they leave through the openings 36 to pass through the meshes 38, 39 and 40 on which the sodium chloride and the silica which are present condense. The gases from which the solid residues have thus been largely removed then penetrate into the air bag via the circular free space 43 existing between the curved end 34 of the diffuser 33 and the annular ring 30.

A generator as represented in FIGS. 5 to 8 operates in a very similar way, with the proviso that the gases originating from the ignition device 116 must, in order to ignite the charge 118, break the wall of the housing 130 of the case constituting the thin metal casing 125.

A pyrotechnic gas generator according to the invention finds its preferred application as a gas generator for an air bag located in the steering wheel of a motor vehicle in order to protect the driver of this vehicle or located on the dashboard in order to protect the front passenger.

EXAMPLE

A generator according to that represented in FIG. 1 was manufactured.

The body of the generator was made of stainless steel and satisfies the following characteristics:

total height: 35.5 mm external diameter of the lateral wall 3: 47 mm.

The closure ring 6 was also made of stainless steel and carried an igniter of the type Davey Bickford DD1714PR. This igniter had an electrical resistance of 2.15 ohms.

The casing 25 was made of aluminium of thickness 0.22 mm.

The propellant block 18 was in accordance with that represented in FIG. 2 and weighed 19 g. Its composition was as follows:

silicone binder: 20 parts by weight, ammonium perchlorate: 47 parts by weight, sodium nitrate; 33 parts by weight.

The lateral wall 3 carried 4 cylindrical orifices 4 of diameter 3.5 mm.

The diffuser 33 had an external diameter of 80 mm.

The condensation mesh 38 was a mesh of grid size 2.1 mm×2.1 mm, made with a wire of diameter 1 mm, and the mesh surrounded the generator once.

The references 39 and 40 represent the windings around the generator of two meshes of grid size 1.0 mm×1.0 mm made with a wire of diameter 0.5 mm.

The generator was lit in a 60 liter container.

The maximum pressure in the container was 0.26 MPa.

The combustion time at 90% maximum pressure was 33 ms (milliseconds).

We claim:

1. Pyrotechnic gas generator (1) for an air bag intended to protect the occupants of a motor vehicle, comprising in particular:

i) a hollow cylindrical body consisting of a circular base (2) extended by a cylindrical lateral wall (3) having, in proximity to the base (2), orifices (4) which connect inside and outside of the said hollow body, said wall (3) being terminated by a thinned end (5) and having an external shoulder (29) located under the orifices (4);

ii) a circular closure ring (6) crimped into said thinned end (5) of the lateral wall (3), said ring having a central orifice (11) in which a cylindrical ignition device (14, 16, 17) which penetrates inside said hollow body is fixed in a gas-tight manner;

iii) a pyrotechnic charge (18) in the form of an annular block, arranged inside said hollow body around the ignition device (14, 16, 17) and consisting essentially of a silicone binder and of a mixture of ammonium perchlorate and sodium nitrate, a height (h) of said annular charge (18) being less than a distance (d1) existing inside said hollow body between inner surfaces of the closure ring (6) and of the base (2), and a maximum thickness (em) of said annular charge (18) being less than a radial distance (d2) separating, inside said hollow body, the lateral wall (3) and the ignition device (14, 16, 17), so that the pyrotechnic charge (18) presents free surfaces which can all be covered by the gases originating from said ignition device (14, 16, 17);

iv) wedging means (23, 24) which allow the gases to circulate and which are arranged between the closure ring (6) and the charge (18) and between the base (2) and the charge (18);

v) a thin metal casing (25) interposed, inside said hollow body, between said charge (18) and both said lateral wall (3) and said base (2) so as to close off said orifices (4) in a gas-tight manner;

vi) a deflector (35) and a condenser (38, 39, 40) which are wedged between an outer ring (30) supported by said external shoulder (29) and an external diffuser (33) crimped onto circumference of the base (2).

2. Generator according to claim 1, wherein said annular pyrotechnic charge (18) includes a plurality of hollow internal cylindrical channels (21) whose axes (21) are equidistant from the axis (22) of the generator.

3. Generator according to claim 1 wherein a ratio R between dead volume existing inside the hollow cylindrical body of the generator and volume of said pyrotechnic charge (18) satisfies the relationship:

$1 \leq R \leq 2$.

4. Generator according to claim 3 wherein said ratio R is close to 1.4.

5. Generator according to claim 1 wherein said thin metal casing (25) has the form of a cylindrical case presenting one end closed via a circular face (26) and another end which is open (28).

6. Generator according to claim 5 wherein said open end (28) of said casing (25) is pinched between said closure ring (6) and said thinned end (5) of said lateral wall (3).

7. Generator according to claim 1 wherein said thin metal casing (125) has the form of a cylindrical case presenting an upper end closed by a substantially plane circular face (129) and a lower end closed by a circular face (127) having a central cylindrical housing (130).

8. Generator according to claim 7 wherein each of the circular faces (127, 129) of said casing (125) incorporates wedging means for the pyrotechnic charge.

9. Generator according to claim 8 wherein said wedging means consist of cylindrical bosses (135) and radial ribs (134) which allow the gases to circulate.

10. Generator according to claim 1 wherein said outer ring has an upper face provided with at least one positioning rib (41).

* * * * *